United States Patent Office 3,293,095
Patented Dec. 20, 1966

3,293,095
METHOD OF PRODUCING OIL ABSORPTIVE LAMINATES
John C. Pitzer, Cincinnati, Ohio, assignor to Formica Corporation, Cincinnati, Ohio, a corporation of Delaware
No Drawing. Filed Oct. 10, 1962, Ser. No. 229,742
7 Claims. (Cl. 156—155)

This invention relates to novel laminated articles. More particularly, this invention relates to novel thermoset phenolic resin-impregnated laminated articles characterized by improved oil absorption as compared to conventionally prepared phenolic laminates, and further relates to methods of producing these oil absorptive laminated articles. In addition, this invention relates to strong, lightweight, oil-absorptive articles of manufacture comprising my novel thermoset phenolic resin-impregnated laminated articles which are especially suited for use in difficultly accessible or inaccessible locations.

Many articles of manufacture which are subject to friction when in use and which, as a result, normally require in-service lubrication, such as ball bearing retainers or separators, thrust washers, and the like, are frequently installed in locations where such lubrication is difficult or even impossible to perform. In such cases, lubrication prior to installation is all that is possible. As can be readily appreciated, this can give rise to serious problems. For example, in the case of a ball bearing retainer or separator fabricated from a relatively non-absorbing material such as non-porous metal or conventionally prepared thermoset phenolic resin-impregnated laminated tubing, lubrication prior to installation merely results in surface adsorption of small quantities of lubricant which are quickly dissipated in service, leading to failure of the bearing and, in many cases, to replacement of an entire assembly.

Due to the problems connected with the use of these conventionally prepared thermoset phenolic resin-impregnated laminated articles and non-porous metal articles in locations where in-service lubrication is difficult or impossible, it has long been accepted practice to fabricate articles of the type in question from sintered metal, which can absorb quantities of lubricant sufficient to provide for long term lubrication of the article while in use in an inaccessible location. However, aside from the difficulties involved in fabricating sintered metal articles, another of their disadvantages is that they are fairly heavy for their size, much heavier, in fact, than the corresponding size article prepared from a thermoset phenolic resin-impregnated laminate. This too can pose serious practical difficulties, particularly if these sintered metal articles are used where weight is an important consideration, e.g., in airplanes, missiles, and the like. Thus, in many cases the use of self-lubricating sintered metal articles can create as many problems as it solves.

I have now prepared strong, lightweight, oil-absorptive thermoset phenolic resin-impregnated laminated articles for use in difficultly accessible or inaccessible locations which avoid the problems inherent in the corresponding sintered metal articles while also providing a degree of in-service self-lubrication not possible using the corresponding conventionally prepared thermoset phenolic resin-impregnated laminated articles or non-porous metal articles. More particularly, the present invention involves the preparation of oil-absorptive thermoset phenolic resin-impregnated laminated articles by means of a sequence of steps which comprises:

(A) impregnating a base material, e.g., fine weave cotton fabric, with an aqueous solution of a water-soluble leachable solid material, e.g., sugar, and then drying the resulting impregnated base material, (B) impregnating the dried, leachable solid-impregnated base material with a solution of a water-insoluble, organic solvent-soluble thermosetting phenolic resin and then drying the resulting doubly-impregnated base material, (C) curing the thermosetting phenolic resinous impregnant of the dried, doubly-impregnated base material, said base material being in a desired configuration, e.g., a curved or planar laminate, a tube, or the like, to produce a thermoset phenolic resin-impregnated laminated article, and (D) dissolving the leachable solid material from said laminated article, e.g., by contacting it with water for a period of time sufficient to remove substantially all, or at least a substantial amount, of the leachable solid material from the article.

It is, therefore, an object of my invention to provide novel laminated articles.

It is also an object of my invention to provide novel thermoset phenolic resin-impregnated laminated articles characterized by improved oil absorption as compared to conventionally prepared phenolic laminates.

A further object of my invention is to provide strong, lightweight, oil-absorptive articles of manufacture comprising my novel thermoset phenolic resin-impregnated laminated articles which are especially suited for use in difficultly accessible or inaccessible locations.

An additional object of my invention is to provide methods of producing these oil-absorptive laminated articles.

These and other objects of my invention will be discussed more fully hereinbelow.

The base materials employed in practicing the present invention do not differ from those used in preparing conventional thermoset phenolic resin-impregnated industrial laminates. Thus, a wide variety of resin-absorbing materials can be used, including woven and non-woven fibrous sheets prepared from $\alpha$-cellulose or regenerated cellulose fibers, e.g., kraft paper, or from glass or asbestos fibers, or from other natural or synthetic fibers such as cotton, wool, acrylonitrile homo- and co-polymers, polyesters, and the like, as well as mixtures of such fibers, e.g., a mixture of cellulosic and cotton fibers, with sheets prepared from cotton fabric being preferred.

The leachable solid material used to impregnate the base material can be any solid material, organic or inorganic, crystalline or non-crystalline, or mixtures thereof, which is soluble in water at least to the extent necessary to give a treating solution having a dissolved solids concentration at room temperature, i.e., at about 25° C., of about 5% or greater and substantially insoluble in common organic solvents, i.e., those used to dissolve the water-insoluble, organic solvent-soluble thermosetting phenolic resin. The leachable solid material should not substantially affect the cure of the thermosetting phenolic resin. In addition, the leachable solid material should be substantially non-reactive with the thermosetting phenolic resin under the conditions employed when impregnating the leachable solid material-impregnated base material with said resin as well as those employed when subsequently drying the doubly-impregnated base material and curing the resinous impregnant, inasmuch as a substantial amount of co-reaction between the leachable solid material and the resin will prevent the solid material from being dissolved from the article following the cure of the resin to a substantially insoluble and infusible state. Crystalline organic solids, and especially sugars, e.g., sucrose (common table sugar), glucose (grape sugar), mannose, galactose, lactose (milk sugar), fructose (fruit sugar), and the like, and crystalline inorganic solids, e.g., sodium acetate, ammonium nitrate, and the like, are especially preferred.

The water-insoluble, organic solvent-soluble thermosetting phenolic resins employed in practicing the present invention, as well as methods for their preparation, are so well known in the art, and have been described so many times, particularly in the patent literature, e.g., in U.S. Patents Nos. 2,205,427, 2,315,087 and 2,328,592, among others, that only the most cursory description thereof is deemed necessary. In general, these resins are potentially hardenable reaction or condensation products of a phenolic substance with an aldehyde, in mol ratios of aldehyde:phenol ranging from about 0.5:1 to about 3:1, respectively, which have been carried to an intermediate stage of condensation whereby they become insoluble in water and soluble in common organic solvents while also remaining capable of being converted, under suitable reaction conditions (heat, pressure, catalysts or combinations thereof), to a substantially insoluble and infusible form.

In addition to phenol itself, other phenolic substances, e.g., substituted phenols such as o-, m- and p-cresol, p-propyl phenol, p-n-butyl phenol, p-tert-butyl phenol, p-tert-amyl phenol, p-octyl phenol, p-cyclohexyl phenol, p-benzyl phenol, p-phenyl phenol, xylenols, i.e., 2,3-dimethyl phenol, 2,4-dimethyl phenol, 2,5-dimethyl phenol, 2,6-dimethyl phenol, 3,4-dimethyl phenol, 3,5-dimethyl phenol, and the like, as well as mixtures thereof, can be used either together with or instead of phenol in preparing these resinous reaction products. Similarly, formaldehyde is the preferred aldehyde reactant, but other aldehydes, e.g., acetaldehyde, propionaldehyde, butyraldehyde, benzaldehyde, and the like, or compounds engendering aldehydes, e.g., paraformaldehyde, paraldehyde, hexamethylenetetramine, and the like, can also be used either in addition to or instead of formaldehyde. The particular properties desired in the thermosetting phenolic resin, aside from water-insolubility and organic solvent-solubility, and in the final product, as well as economic considerations, are among the elements which will determine the choice of the particular phenolic substance and aldehyde employed.

Various conventionally practiced modifications may also be carried out on these water-insoluble, organic solvent-soluble thermosetting phenolic resins. For example, they may me modified by the incorporation of from about 5% to about 15% by weight, based on the total weight of resin solids, of drying, semi-drying or non-drying glyceride oils such as tung oil, linseed oil, soya oil, castor oil, and the like. In addition, plasticizers such as dibutyl phthalate, diamyl phthalate, dihexyl phthalate, dioctyl phthalate, and the like may be employed in amounts ranging from about 10% to about 20% by weight, again based on the total weight of resin solids. When such modifications are carried out, the modifiers themselves, e.g., the aforementioned glyceride oils and plasticizers, will generally be considered as part of the total resin solids, inasmuch as in most cases they will not volatilize or leach out of the resin during subsequent treating steps and thus they will become part of the resin system.

The solution or syrup containing the water-insoluble, organic solvent-soluble thermosetting phenolic resin used to impregnate the base material subsequent to the impregnation of said base material with the aqueous solution of the leachable solid material will be prepared by dissolving the resin in a normally liquid organic solvent, preferably a polar solvent having a boiling point not greater than about 150° C., e.g., a monohydric alcohol such as methanol, ethanol, isopropanol, and the like, a ketone such as acetone, methyl ethyl ketone, methyl isopropyl ketone, diethyl ketone, ethyl propyl ketone, dipropyl ketone, and the like, or an aromatic compound such as benzene, toluene, xylene, and the like. As might be expected, mixtures of these solvents can also be employed, and in some cases will even be preferred.

As previously indicated, when impregnating the base material with the leachable solid material, the latter should be present in aqueous solution in an amount which constitutes at least about 5% by weight of the solution. In most cases, the aqueous solution will have a solids content ranging from about 10% to about 25% or more by weight, based on the total weight of the solution. It should be noted, however, that these are practical limitations rather than critical ones, inasmuch as they merely provide aqueous solutions with which the base material can be satisfactorily impregnated with a minimum of treatment.

Similarly, the water-insoluble, organic solvent-soluble thermosetting phenolic resin can be present in solution in one or more of the aforementioned organic solvents in amounts ranging from about 30% to about 65% by weight, and preferably from about 50% to about 60% by weight, based on the total weight of the solution.

The base material can be impregnated to give the desired solids content of leachable solid material and thermosetting phenolic resin by means of one or several treatments with the respective impregnating solutions, using such methods as dipping, roll coating, spraying, and the like. In the case of the leachable solid material, impregnation will be carried out to give a solids content ranging from about 10% to about 50% by weight, and preferably from about 20% to about 30% by weight, based on the dry weight of the impregnated base material. Following impregnation, the sheet is dried, preferably at elevated temperatures using a forced hot air drying oven, infrared heating means, or the like, to a moisture content of less than about 4% by weight, based on the weight of the dried, impregnated base material. The dried, impregnated base material will then be impregnated with the thermosetting phenolic resin to give a resin solids content ranging from about 35% to about 65% by weight, and preferably from about 50% to about 60% by weight, based on the dry weight of the doubly-impregnated base material, and then dried to a volatile content of less than about 10% by weight, and preferably, in the case of an unplasticized phenolic resin, to a volatile content of less than about 6% by weight, based on the weight of the dried, doubly-impregnated base material.

Conventional laminating techniques, involving consolidation by means of heat alone or heat and pressure, are employed in preparing laminates from the dried, doubly-impregnated base material. For example, one or several sheets of this material can be placed between press plates and heat-treated in a laminating press, e.g., at a temperature of from about 125° C. to about 170° C. under a pressure of from about 50 p.s.i. to about 1400 p.s.i. for from about 30 minutes to about 6 hours or more, depending on the particular phenolic resin used, the thickness of the laminate, etc., to convert the thermosetting phenolic resinous impregnant thereof to a substantially insoluble and infusible state. In addition to curved or planar laminates prepared by pressing, tubing can be prepared by any conventional method, for example by convolutely winding a sheet or sheets of the dried, doubly-impregnated base material around a cylindrical mandrel, preferably one which is heated to a temperature of from about 120° C. to about 160° C., to achieve a desired thickness, next rolling the impregnated base material on the mandrel between pressure rolls for from about 30 seconds to about 60 minutes or more, depending on the particular phenolic resin used, the thickness and diameter of the tube, etc., preferably using rolls which are heated to a temperature of from about 120° C. to about 160° C. so as to exert tension on the material wound on the mandrel, then heating the impregnated base material on the mandrel, e.g., by oven-baking at a temperature of from about 120° C. to about 160° C. for from about 90 minutes to about 8 hours or more, again depending on the particular phenolic resin used, the thickness and diameter of the tube, etc., and finally removing the impregnated tubing from the mandrel and further heat-treating it at a temperature of from about 120° C.

to about 160° C. for from about 2 hours to about 8 hours to insure dimensional stability in the tubing. For larger diameter tubing an oil soak treatment, carried out by immersing the tubing for from about 12 hours to about 48 hours in oil heated to a temperature of from about 90° C. to about 120° C. or higher, may precede the aforementioned heat-treatment to impart even greater dimensional stability to the tubing.

The leachable solid material can be dissolved from the thus-produced laminated articles by merely steeping them in water, preferably hot water held at a temperature of from about 60° C. to about 100° C., for as long as is necessary to insure removal of substantially all of the solid material or at least a substantial amount thereof, e.g., 75% or more. This removal of the leachable solid material can be accomplished either before or after the laminates are fabricated to their final shapes, e.g., either before or after laminated tubing is cut up into ball bearing retainer rings and the holes for the ball bearings drilled therein. The laminates can be fabricated to provide a wide variety of shapes and sizes. For example, besides ball bearing retainer rings, laminated tubing prepared according to the practice of the present invention can be shaped and machined into retainer rings for cylindrical bearings, tapered bearings, and the like.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

*Example I*

A sheet of commercially available fine weave cotton fabric having a weight of four yards per pound and a thread count of 80 x 80 was passed through a treating tank containing a 10% aqueous sucrose solution to impregnate the fabric throughout with sucrose. Following this impregnation, the wet fabric was dried in a forced hot air oven at a temperature of approximately 135° C. to a moisture content of 1.6%, based on the dry weight of the impregnated fabric. The resulting dried, impregnated sheet was found to contain 23.8% of sucrose, again based on the dry weight of the impregnated fabric.

Next, the dried, impregnated sheet was given two passes through a treating tank containing an ethanol solution of a commercailly available water-insoluble, organic solvent-soluble thermosetting cresol-formaldehyde resin having a resin solids content of 55%. Following the second pass the wet, doubly-impregnated (with sugar and resin) fabric was dried in a forced hot air oven at a temperature of 140° C. to a volatile content of 10% and a flow of 18%, each based on the dry weight of the doubly-impregnated fabric. The total resin pickup after the second pass was found to be 53.4%, again based on the dry weight of the doubly-impregnated fabric.

The dried, doubly-impregnated sheet was then formed into a thermoset phenolic resin-impregnated laminated tube by first convolutely winding it around a cylindrical mandrel which was heated to a temperature of 140° C., next rolling the fabric-wound mandrel for one minute between pressure rolls heated to 140° C. to exert tension on the fabric, then oven-baking the fabric-wound mandrel for three hours at 140° C., and finally removing the tube from the mandrel and post-curing the tube by oven-baking it for an additional four hours at 140° C. to insure dimensional stability in the final fabricated ball bearing retainer rings. The resulting tube had a wall thickness of 0.0625 inch, an inside diameter of 0.151 inch and an outside diameter of 0.285 inch. The tube was cut into rings, each 0.5 inch in length, and holes were then drilled through each ring to permit it to receive ball bearings.

The resulting retainer rings were given two successive 4-hour baths in water heated to 90° C. to leach out the sugar, and were then dried for 24 hours at 50° C. The dried rings were found to be highly oil-absorptive and thus suited for use in difficultly accessible locations.

*Examples II–IX*

In each of these examples the procedure of Example I was again repeated in every detail except for the following. In the first four (Examples II–V), the 10% aqueous sucrose solution used in Example I to provide the leachable solid impregnant in the base material was replaced by a 10% aqueous solution of glucose, a 15% aqueous solution of fructose, a 20% aqueous solution of sodium acetate and a 25% aqueous solution of ammonium nitrate, respectively. In the remaining four examples, the 10% aqueous sucrose solution was again replaced by the respective solutions of leachable solid materials employed in Examples II–V, and in addition the cresol-formaldehyde resin used in Example I was also replaced in each case by an ethanol solution of a commercially available water-insoluble, organic solvent-soluble thermosetting phenol-formaldehyde resin having a resin solids content of 58%. In every case the resulting ball bearing retainer rings were highly oil-absorptive.

*Example X*

The procedure employed in Example I was again repeated in every detail except for the following.

The dried, doubly-impregnated (with sugar and resin) fine weave cotton fabric sheet was formed into a thermoset phenolic resin-impregnated laminated tube by first convolutely winding it around a 1⅝ inch cylindrical mandrel which was heated to a temperature of 140° C., next rolling the fabric-wound mandrel for two minutes between pressure rolls heated to 140° C. to exert tension on the fabric, then oven-baking the fabric-wound mandrel for seven hours at 140° C., and finally removing the tube from the mandrel and post-curing the tube by first oil-soaking it for 24 hours at 105° C. and then oven-baking it for an additional 8 hours at 140° C.

Next, after grinding the tube to an outside diameter of 2³⁄₁₆ inches, it was machined to an outside diameter of 2 inches and an inside diameter of 1¾ inches. The machined tube was then cut into rings, each 0.5 inch in length, and holes were drilled through each ring to permit it to receive ball bearings.

The resulting retainer rings were weighed, then placed in water at 99° C. for 24 hours. Next, after removing the rings from the water and wiping them dry, they were stored in a dry room at 50° C. for 24 hours and then re-weighed. At this point, the rings were found to have lost an average of 2.4% in weight. Finally, the rings were immersed in lubricating oil at room temperature for 17 days, following which they were removed from the oil, wiped dry, and then reweighed. The rings were found to have gained an average of 4.3% in weight, based on the weight of the rings prior to immersion in oil. In contrast to this, rings prepared in the same manner from fine weave cotton fabric which had not been impregnated with sucrose prior to being impregnated with the phenolic resin gained an average of only 0.2% in weight after immersion for 17 days at room temperature in the oil.

It will be obvious to those skilled in the art that other changes and variations can be made in carrying out the present invention without departing from the spirit and scope thereof as defined in the appended claims.

I claim:

1. A process for the preparation of an oil-absorptive laminated article which comprises (1) impregnating a porous base material with an aqueous solution of a leachable solid material, (2) drying the resulting impregnated base material, (3) impregnating the resulting dried, leachable solid material-impregnated base material with a water-insoluble, organic solvent-soluble thermosetting phenolic resin syrup, said leachable solid material being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said phenolic resin to a substantially insoluble and infusible form, and (7) contacting the resulting laminated article with water to dissolve a substantial amount of said leachable solid material therefrom.

2. A process for the preparation of an oil-absorptive laminated article which comprises (1) impregnating a porous base material with an aqueous solution of a leachable solid (inorganic) material, (2) drying the resulting impregnated base material, (3) impregnating the resulting dried, leachable solid inorganic material-impregnated base material with a water-insoluble, organic solvent-soluble thermosetting phenolic resin syrup, said leachable solid inorganic material being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said phenolic resin to a substantially insoluble and infusible form, and (7) contacting the resulting laminated article with water to dissolve a substantial amount of said leachable solid inorganic material therefrom.

3. A process for the preparation of an oil-absorptive laminated article which comprises (1) impregnating a porous base material with an aqueous solution of a leachable solid organic material, (2) drying the resulting impregnated base material, (3) impregnating the resulting dried, leachable solid organic material-impregnated base material with a water-insoluble, organic solvent-soluble thermosetting phenolic resin syrup, said leachable solid organic material being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said phenolic resin to a substantially insoluble and infusible form, and (7) contacting the resulting laminated article with water to dissolve a substantial amount of said leachable solid organic material therefrom.

4. A process for the preparation of an oil-absorptive laminated article which comprises (1) impregnating a porous cellulosic base material with an aqueous sucrose solution having a solids content at 25° C. of at least about 5%, (2) drying the resulting impregnated base material, (3) impregnating the resulting dried, sucrose-impregnated base material with a water-insoluble, organic solvent-soluble thermosetting cresol-formaldehyde resin syrup, said sucrose being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said cresol-formaldehyde resin to a substantially insoluble and infusible form, and (7) contacting the resulting laminated article with water to dissolve a substantial amount of said sucrose therefrom.

5. A process for the preparation of an oil-absorptive laminated article which comprises (1) impregnating a porous cellulosic base material with an aqueous sodium acetate solution having a solids content at 25° C. of at least about 5%, (2) drying the resulting impregnated base material, (3) impregnating the resulting dried, sodium acetate-impregnated base material with a water-insoluble, organic solvent-soluble thermosetting cresol-formaldehyde resin syrup, said sodium-acetate being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said cresol-formaldehyde resin to a substantially insoluble and infusible form, and (7) contacting the resulting laminated article with water to dissolve a substantial amount of said sodium acetate therefrom.

6. A process for the preparation of an oil-absorptive laminated article which comprises (1) impregnating a porous cellulosic base material with an aqueous sucrose solution having a solids content at 25° C. of at least about 5%, (2) drying the resulting impregnated base material, (3) impregnating the resulting dried, sucrose-impregnated base material with a water-insoluble, organic solvent-soluble thermosetting phenol-formaldehyde resin syrup, said sucrose being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said phenol-formaldehyde resin to a substantially insoluble and infusible form, and (7) contacting the resulting laminated article with water to dissolve a substantial amount of said sucrose therefrom.

7. A process for the preparation of an oil-absorptive laminated article which comprises (1) impregnating a porous cellulosic base material with an aqueous sodium acetate solution having a solids content at 25° C. of at least about 5%, (2) drying the resulting impregnated base material, (3) impregnating the resulting dried, sodium acetate-impregnated base material with a water-insoluble, organic solvent-soluble thermosetting phenol-formaldehyde resin syrup, said sodium acetate being substantially insoluble in said resin syrup, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said phenol-formaldehyde resin to a substantially insoluble and infusible form, and (7) contacting the resulting laminated article with water to dissolve a substantial amount of said sodium acetate therefrom.

References Cited by the Examiner
UNITED STATES PATENTS

| | | | |
|---|---|---|---|
| 2,772,995 | 12/1956 | Wilson | 156—155 |
| 2,801,674 | 8/1957 | Swerick | 156—155 |
| 2,909,456 | 10/1959 | Graham | 161—165 |
| 2,946,094 | 7/1960 | Kawaski | 264—49 |
| 2,994,617 | 8/1961 | Proctor | 161—88 |
| 3,085,922 | 4/1963 | Koller | 161—170 |
| 3,104,174 | 9/1963 | Harris | 117—4 |
| 3,214,501 | 10/1965 | Straus | 264—49 |

EARL M. BERGERT, *Primary Examiner.*

R. I. SMITH, M. L. KATZ, *Assistant Examiners.*